United States Patent
Seven et al.

(10) Patent No.: US 11,034,823 B2
(45) Date of Patent: Jun. 15, 2021

(54) HIGH MODULUS OLEFIN COMPOUNDS FOR FIBER OPTIC CABLE BUFFER TUBES

(71) Applicant: Dow Global Technologies LLC, Midland, MI (US)

(72) Inventors: Karl M. Seven, Collegeville, PA (US); Mohamed Esseghir, Collegeville, PA (US)

(73) Assignee: Dow Global technologies LLC, Midland, MI (US)

(*) Notice: Subject to any disclaimer, the term of this patent is extended or adjusted under 35 U.S.C. 154(b) by 426 days.

(21) Appl. No.: 15/781,587

(22) PCT Filed: Dec. 6, 2016

(86) PCT No.: PCT/US2016/065109
§ 371 (c)(1),
(2) Date: Jun. 5, 2018

(87) PCT Pub. No.: WO2017/100175
PCT Pub. Date: Jun. 15, 2017

(65) Prior Publication Data
US 2020/0263006 A1    Aug. 20, 2020

Related U.S. Application Data

(60) Provisional application No. 62/265,735, filed on Dec. 10, 2015.

(51) Int. Cl.
*C08L 23/06*  (2006.01)

(52) U.S. Cl.
CPC .......... *C08L 23/06* (2013.01); *C08L 2205/035* (2013.01); *C08L 2205/08* (2013.01)

(58) Field of Classification Search
CPC . C08L 23/06; C08L 2205/035; C08L 2205/08
USPC ...................................................... 524/282
See application file for complete search history.

(56) References Cited

U.S. PATENT DOCUMENTS

| | | |
|---|---|---|
| 4,950,541 A | 8/1990 | Tabor et al. |
| 5,326,835 A | 7/1994 | Anvenainen et al. |
| 5,574,816 A | 11/1996 | Yang et al. |
| 5,911,023 A | 6/1999 | Risch et al. |
| 6,028,145 A | 2/2000 | Niebergall et al. |
| 6,472,473 B1 | 10/2002 | Ansems et al. |
| 6,809,154 B2 | 10/2004 | Lindahl et al. |
| 6,841,620 B2 | 1/2005 | Ansems et al. |
| 6,960,635 B2 | 11/2005 | Stevens et al. |
| 7,355,089 B2 | 4/2008 | Chang et al. |
| 8,476,393 B2 | 7/2013 | Shan et al. |
| 9,303,156 B2 * | 4/2016 | Weeks ................ C08L 79/00 |
| 9,598,565 B2 * | 3/2017 | Seven ................ G02B 6/4433 |
| 2004/0240809 A1 | 12/2004 | Tedder et al. |
| 2006/0045439 A1 | 3/2006 | Brown et al. |
| 2006/0199930 A1 | 9/2006 | Shan et al. |
| 2007/0167578 A1 | 7/2007 | Arriola et al. |
| 2008/0269412 A1 | 10/2008 | Carnahan et al. |
| 2008/0311812 A1 | 12/2008 | Arriola et al. |
| 2011/0082258 A1 | 4/2011 | Walton et al. |
| 2011/0313106 A1 | 12/2011 | Shan et al. |
| 2011/0313107 A1 | 12/2011 | Shan et al. |
| 2011/0313108 A1 | 12/2011 | Shan et al. |
| 2014/0343229 A1 | 11/2014 | Weeks et al. |
| 2016/0289433 A1 | 10/2016 | Seven et al. |

FOREIGN PATENT DOCUMENTS

| | | |
|---|---|---|
| EP | 778289 A1 | 6/1997 |
| WO | 2011/163191 A1 | 12/2011 |

* cited by examiner

*Primary Examiner* — Kelechi C Egwim

(57) ABSTRACT

Wet buffer tubes for use in fiber optic cables are made from a composition comprising in weight percent (wt %) based on the weight of the composition: (A) 22-49% polypropylene (PP), (B) 50-65% high density polyethylene (HDPE), (C) 7-12% compatibilizer comprising in wt % based on the weight of the compatibilizer: (1) 30-90% olefin block composite comprising ethylene-propylene (EP) copolymer, isotactic polypropylene (iPP), and an EP-iPP diblock polymer, and (2) 10-70% maleic anhydride grafted HDPE (MAH-g-HDPE); and (D) 0.05-5.0% nucleating agent.

13 Claims, 1 Drawing Sheet

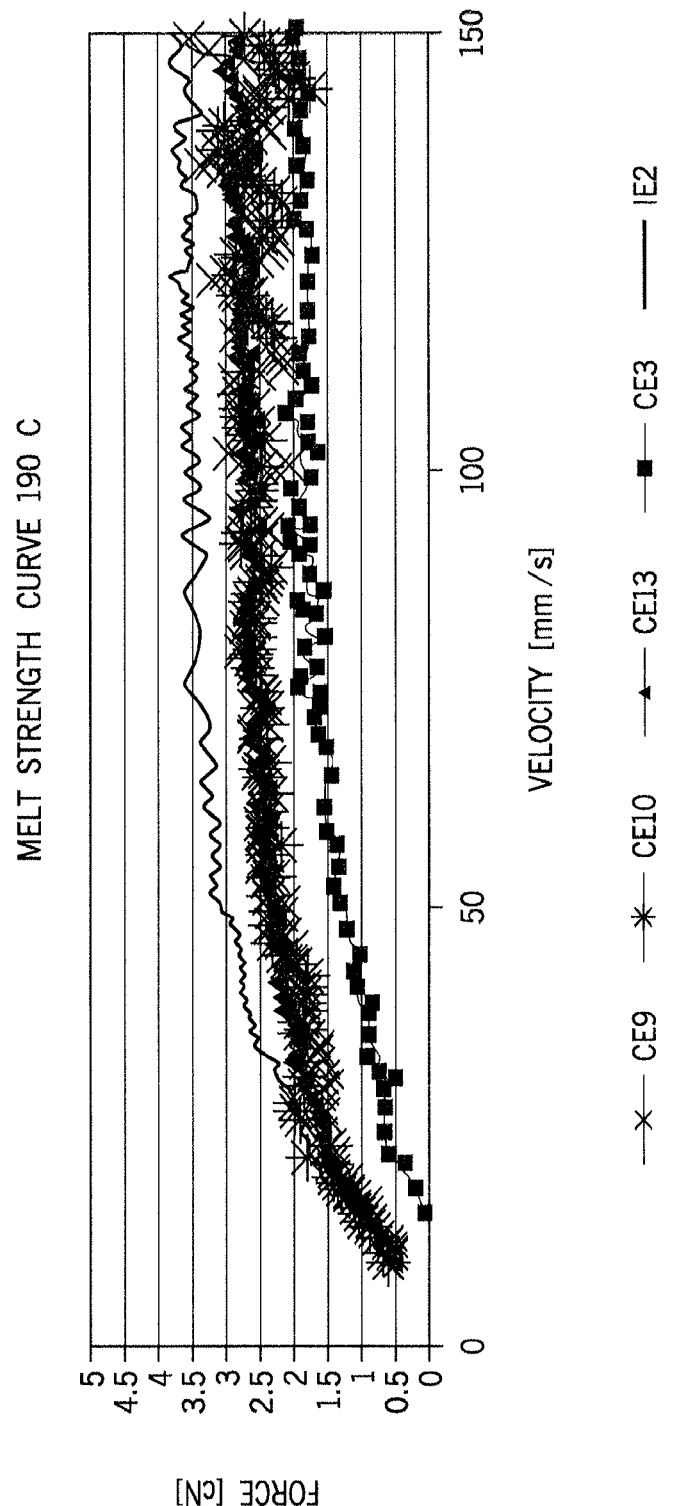

HIGH MODULUS OLEFIN COMPOUNDS FOR FIBER OPTIC CABLE BUFFER TUBES

BACKGROUND OF THE INVENTION

In wet buffer tubes, optical fibers in fiber optic cables are suspended in a gel filling compound which provides mechanical protection and functions as a barrier to moisture ingress. The gel or grease, however, can be absorbed into the polymeric buffer tube material over time which causes a loss in modulus and reduces its ability to provide the desired mechanical protection. Retention of the polymer modulus after exposure to buffer tube gel is a critical parameter for minimizing mechanical stresses on the fiber.

SUMMARY OF THE INVENTION

In one embodiment the invention is a composition comprising, or consisting essentially of, or consisting of, in weight percent (wt %) based on the weight of the composition:
  (A) 22-49% polypropylene (PP),
  (B) 50-65% high density polyethylene (HDPE),
  (C) 7-12% compatibilizer comprising in wt % based on the weight of the compatibilizer:
    (1) 30-90% olefin block composite comprising, consisting essentially of, or consisting of, ethylene-propylene (EP) copolymer, isotactic polypropylene (iPP), and an EP-iPP diblock polymer, and
    (2) 10-70% maleic anhydride grafted HDPE (MAH-g-HDPE); and
  (D) 0.05-5.0% nucleating agent.

In one embodiment the HDPE is a bimodal HDPE (b-HDPE). In one embodiment the composition further comprises at least one of a filler and additive.

In one embodiment the invention is a process of making a tube, the process comprising the steps of:
  (I) Compounding:
    (A) 22-49% polypropylene (PP),
    (B) 50-65% high density polyethylene (HDPE),
    (C) 7-12% compatibilizer comprising in wt % based on the weight of the compatibilizer:
      (1) 30-90% olefin block composite comprising, consisting essentially of, or consisting of, ethylene-propylene (EP) copolymer, isotactic polypropylene (iPP), and an EP-iPP diblock polymer, and
      (2) 10-70% maleic anhydride grafted HDPE (MAH-g-HDPE),
    (D) 0.05-5.0% nucleating agent, to form a homogeneous mixture; and
  (II) extruding the mixture of (a) into the shape of a tube.

In one embodiment the compounding is performed under melt mixing conditions. In one embodiment at least one of nucleating agent and a filler is also compounded to form the homogeneous mixture. In one embodiment the HDPE is a bimodal HDPE (b-HDPE).

In one embodiment the invention is a tube made by any of the process embodiments described above. In one embodiment the tube is a buffer tube for fiber optic cables. In one embodiment the invention is a fiber optic cable comprising a buffer tube.

BRIEF DESCRIPTION OF THE DRAWINGS

The FIGURE is a melt strength curve at 190° C. of the samples from Comparative Examples CE3, 9-10 and 13 and Inventive Example IE2.

DETAILED DESCRIPTION OF THE PREFERRED EMBODIMENT

Definitions

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 2.5 to 5.5; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" means a polymer prepared by the polymerization of at least two different types of monomers. This generic term includes both classical copolymers, i.e., polymers prepared from two different types of monomers, and polymers prepared from more than two different types of monomers, e.g., terpolymers, tetrapolymers, etc.

"Mer", "mer unit" and like terms means that portion of a polymer derived from a single reactant molecule; for example, a mer unit derived from ethylene has the general formula —$CH_2CH_2$—.

"Olefin" and like terms mean an unsaturated, aliphatic or alicyclic, substituted or unsubstituted hydrocarbon having one or more double bonds. "Substituted olefin" means an olefin in which one or more hydrogen atoms bound to any carbon of the olefin is replaced by another group such as a halogen, aryl, substituted aryl, cycloalkyl, substituted cycloalkyl, hetero-cycloalkyl, substituted hetero-cycloalkyl, halogen, haloalkyl, hydroxy, phosphido, alkoxy, amino, thio, nitro, or a combinations of two or more such substituents.

"Elastomer" and like terms means a rubber-like polymer that (i) can be stretched to at least twice its original length and which retracts very rapidly to approximately its original length when the force exerting the stretching is released, and (ii) has a glass transition temperature (fig) which is equal to or less than 0° C.

"Olefin elastomer" and like terms mean an elastomeric polymer comprising at least 50 mole percent (mol %) of units derived from one or more olefins.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition", "formulation" and like terms means a mixture or blend of two or more components. In the context of this invention, the composition includes Components A-D plus any additives, fillers and the like.

Unless stated to the contrary, implicit from the context, or customary in the art, all parts and percents are based on weight and all test methods are current as of the filing date of this disclosure.

Polypropylene (PP)

The polypropylene used in the practice of this invention, component (A) of the composition, can be any polypropylene polymer made via any means known to one of skill in the art or polypropylene polymer blend, such as a homopolymer polypropylene, a random ethylene or butene copolymer of polypropylene, or an impact modified polypropylene blend which contains either a homopolymer polypropylene or a crystalline random copolymer of ethylene and propylene combined with a rubbery ethylene-propylene copolymer.

In one embodiment, the polypropylene used in the practice of this invention is a polymer having at least half of its mer units derived from propylene. These include homopolymers of propylene as well as copolymers of propylene with one or more monomers with which it (i.e., propylene) is copolymerizable such as ethylene, 1-butene, 1-pentene, 1-hexene, 1-octene, one or more conjugated or non-conjugated dienes, and combinations of two or more of these comonomers.

In one embodiment the polypropylene is a high crystallinity polypropylene, more typically a high crystallinity polypropylene with a melt flow rate (MFR) of less than or equal to ($\leq$) 12 g/10 min (230° C./2.16 kg), even more typically with a MFR$\leq$4 g/10 min (230° C./2.16 kg). In one embodiment the high crystallinity polypropylene is a propylene homopolymer or mini-random copolymer (i.e., a propylene copolymer comprising 98% to less than 100% mer units derived from propylene monomer with the remainder of mer units derived from another olefin monomer, typically ethylene).

High crystallinity means that the polypropylene has crystallinity equal to or greater than 40%, preferably equal to or greater than 55%, as measured by differential scanning calorimetry (DSC) heat of fusion. DSC is a common technique that can be used to examine the melting and crystallization of crystalline and semi-crystalline polymers. General principles of DSC measurements and applications of DSC to studying crystalline and semi-crystalline polymers are described in standard texts (for instance, E. A. Turi, ed., "Thermal Characterization of Polymeric Materials", Academic Press, 1981).

The term "crystallinity" refers to the regularity of the arrangement of atoms or molecules forming a crystal structure. Polymer crystallinity can be examined using DSC. $T_{me}$ means the temperature at which the melting ends and $T_{max}$ means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

Samples of polymer are pressed into a thin film at a temperature of 177° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of 230° C. The sample is kept at this temperature for about 3 minutes. Then the sample is cooled at a rate of 10° C./min to −40° C., and kept isothermally at that temperature for 3 minutes. Consequently the sample is heated at a rate of 10° C./min until melting is complete. The resulting enthalpy curves are analyzed for peak melt temperature, onset and peak crystallization temperatures, heat of fusion and heat of crystallization, $T_{me}$, $T_{max}$, and any other quantity of interest from the corresponding thermograms as described in U.S. Pat. No. 6,960,635. The factor that is used to convert heat of fusion into nominal weight percent crystallinity is 165 J/g=100 wt % crystallinity. With this conversion factor, the total crystallinity of a propylene-based polymer (units: weight percent crystallinity) is calculated as the heat of fusion divided by 165 J/g and multiplied by 100 percent. For impact copolymers the elastomeric impact modifier contributes negligibly to heat of fusion. As such, to calculate the crystallinity of impact copolymers in the context of determining whether the copolymer is of "high crystallinity", the result of the above calculation is further divided by a factor equal to one minus the weight fraction of elastomeric impact modifier.

In one embodiment the polypropylene used in the practice of this invention is an impact-modified polypropylene. These propylene polymers have a continuous phase which is comprised of a propylene polymer, and an elastomeric phase. The propylene polymer of the continuous phase typically will be a homopolymer propylene polymer or a random or mini-random propylene copolymer, more typically a homopolymer propylene polymer. The propylene polymer may be made using a Ziegler-Natta catalyst, constrained geometry catalyst, metallocene catalyst, or any other suitable catalyst system. When the propylene polymer making up the continuous phase is a homopolymer propylene polymer, the crystallinity of the propylene polymer, as determined by DSC, is preferably at least about 50 percent, more preferably at least about 55 percent, most preferably at least about 62 percent.

The elastomeric phase may be made using a constrained geometry catalyst, Ziegler-Natta catalyst, metallocene catalyst or any other suitable catalyst. Ethylene propylene rubbers are typically made in the second of two reactors coupled in series. Preferred blended elastomers include, but are not limited to, ethylene-octene, ethylene-butylene and ethylenehexene. Typically, the elastomeric content of the impact propylene copolymer or the blend is from 8 to 40, more typically from 12 to 25 and most typically from 15 to 20 wt % based on the weight of the copolymer or blend. In one embodiment, an acceptable substitute for an impact-modified polypropylene component of the composition of this invention is polypropylene homopolymer or mini-random polymer in combination with a polymeric elastomer such as an ethylene-propylene copolymer, each added separately to the composition and in an amount similar to their respective amounts in an impact modified propylene polymer, e.g., 80-90 wt % propylene homopolymer and/or mini-random polymer and 10-20 wt % elastomer.

Certain impact propylene copolymers that can be used in the practice of this invention are more fully described in U.S. Pat. Nos. 6,472,473 and 6,841,620.

High Density Polyethylene (HDPE)

The HDPE used in the practice of this invention, i.e., component (B) of the composition, is known in the art. In one embodiment of the invention, the HDPE has a density from 0.945 to 0.970 g/cc, or from 0.950 to 0.970 g/cc, or from 0.952 to 0.970 glee. In one embodiment of the invention, the HDPE has a melt index (MI, I2) from 1 to 4 g/1 0 min, or from 1.2 to 3.5 g/10 min, or from 1.2 to 3 g/10 min. In one embodiment of the invention, the HDPE has both a density and MI as described above.

In one embodiment the HDPE is a bimodal HDPE (b-HDPE). By "bimodal" is meant that the polymer comprises at least two components, one of which has a relatively low molecular weight and a relatively high density and another of which has a relatively high molecular weight and a relatively low density. By "comprising at least two components" means that the HDPE can comprise more than two components, i.e., "bimodal" includes "multimodal". Typically the molecular weight distribution (MWD) of a polymer produced in a single polymerization stage using a single monomer mixture, a single polymerization catalyst and a single set of process conditions will show a single maximum, the breadth of which will depend on catalyst choice, reactor choice, process conditions, etc. Such a polymer is monomodal, and it is not used as component (B) in this embodiment of the inventive composition.

The bimodal HDPE is produced by polymerization using conditions which create a bimodal polymer product, e.g., using a catalyst system or mixture with two or more different catalytic sites, using two or more stage polymerization processes with different process conditions in the different stages (e.g., different temperatures, pressures, polymerization media, hydrogen partial pressures, etc.). Such bimodal HDPE may be produced relatively simply by a multistage ethylene polymerization, e.g., using a series of reactors, with comonomer addition in only the reactor(s) used for production of the higher/highest molecular weight component(s). Examples of bimodal PE production are given in EP-A-778, 289 and WO92/12182.

The bimodal HDPE that can be used as component (B) of the composition of this embodiment of the invention is more fully described in U.S. Pat. Nos. 6,809,154 and 6,931,184.

Compatibilizer

The compatibilizer used in the practice of this invention, i.e., component (C) of the composition, comprises, or preferably consists essentially of, or more preferably consists of, a mixture of (1) an olefin block composite comprising, consisting essentially of, or consisting of, (a) ethylene-propylene (EP) copolymer, (b) isotactic polypropylene (iPP), and (c) an EP-iPP diblock polymer, and (2) a maleic anhydride grafted high density polyethylene (MAH-g-HDPE). In one embodiment the olefin block composite comprises from 30 to 90, or from 40 to 80, or from 50 to 80, wt % of the compatibilizer. In one embodiment the MAH-g-HDPE comprises from 10 to 70, or from 20 to 60, or from 20 to 50, wt % of the compatibilizer.

Olefin Block Composite

The term "block composite" refers to polymer compositions comprising three components: (1) a soft copolymer, (2) a hard polymer, and (3) a block copolymer having a soft segment and a hard segment. The hard segment of the block copolymer is the same composition as the hard polymer in the block composite and the soft segment of the block copolymer is the same composition as the soft copolymer of the block composite.

The block copolymers present in the olefin block composite can be linear or branched. More specifically, when produced in a continuous process, the block composites can have a polydispersity index (PDI) from 1.7 to 15, from 1.8 to 3.5, from 1.8 to 2.2, or from 1.8 to 2.1. When produced in a batch or semi-batch process, the block composites can have a PDI from 1.0 to 2.9, from 1.3 to 2.5, from 1.4 to 2.0, or from 1.4 to 1.8. The term "olefin block composite" refers to block composites prepared solely or substantially solely from two or more α-olefin types of monomers. In various embodiments, the olefin block composite can consist of only two α-olefin type monomer units. An example of an olefin block composite would be a hard segment and hard polymer comprising only or substantially only propylene monomer residues with a soft segment and soft polymer comprising only or substantially only ethylene and propylene comonomer residues.

In describing olefin block composites, "hard" segments refer to highly crystalline blocks of polymerized units in which a single monomer is present in an amount greater than 95 mol %, or greater than 98 mol %. In other words, the comonomer content in the hard segments is less than 5 mol %, or less than 2 mol %. In some embodiments, the hard segments comprise all or substantially all propylene units. "Soft" segments, on the other hand, refer to amorphous, substantially amorphous or elastomeric blocks of polymerized units having a comonomer content greater than 10 mol %. In some embodiments, the soft segments comprise ethylene/propylene interpolymers.

The term "crystalline," when used to describe olefin block composites, refers to a polymer or polymer block that possesses a first order transition or crystalline melting point ("Tm") as determined by differential scanning calorimetry ("DSC") or equivalent technique. The term "crystalline" may be used interchangeably with the term "semi-crystalline." The term "amorphous" refers to a polymer lacking a crystalline melting point. The term, "isotactic" denotes polymer repeat units having at least 70 percent isotactic pentads as determined by $^{13}$C-nulcear magnetic resonance ("NMR") analysis. "Highly isotactic" denotes polymers having at least 90 percent isotactic pentads.

When referring to olefin block composites, the term "block copolymer" or "segmented copolymer" refers to a polymer comprising two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block composites employed herein are characterized by unique distributions of polymer PDI, block length distribution, and/or block number distribution, due, in a preferred embodiment, to the effect of shuttling agent(s) in combination with the catalyst(s) used in preparing the block composites.

In an embodiment the olefin diblock composite comprises an EP-iPP diblock polymer that has an ethylene content from 43 to 48 wt %, or from 43.5 to 47 wt %, or from 44 to 47 wt %, based on the weight of the diblock copolymer. In an embodiment, the EP-iPP diblock polymer has a propylene content from 57 to 52 wt %, or from 56.5 to 53 wt %, or from 56 to 53 wt %, based on the weight of the EP-iPP diblock polymer.

The olefin block composite employed herein can be prepared by a process comprising contacting an addition polymerizable monomer or mixture of monomers under addition polymerization conditions with a composition comprising at least one addition polymerization catalyst, a cocatalyst and a chain shuttling agent ("CSA"), the process being characterized by formation of at least some of the growing polymer chains under differentiated process conditions in two or more reactors operating under steady state polymerization conditions or in two or more zones of a reactor operating under plug flow polymerization conditions.

Further, the EP-iPP diblock polymers of the block composites comprise from 10 to 90 wt % hard segments and 90 to 10 wt % soft segments.

Within the soft segments, the weight percent ethylene may range from 10% to 75%, or from 30% to 70%. In an embodiment, propylene constitutes the remainder of the soft segment.

Within the hard segments, the weight percent propylene may range from 80% to 100%. The hard segments can comprise greater than 90 wt %, 95 wt %, or 98 wt % propylene.

The block composites described herein may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites have a Block Composite Index ("BCI"), as defined below, that is greater than zero but less than 0.4, or from 0.1 to 0.3. In other embodiments, BCI is greater than 0.4 and up to 1.0. Additionally, the BCI can range from 0.4 to 0.7, from 0.5 to 0.7, or from 0.6 to 0.9. In some embodiments, BCI ranges from 0.3 to 0.9, from 0.3 to 0.8, from 0.3 to 0.7, from 0.3 to 0.6, from 0.3 to 0.5, or from 0.3 to 0.4. In other embodiments, BCI ranges from 0.4 to 1.0, from 0.5 to 1.0, from 0.6 to 1.0, from 0.7 to 1.0, from 0.8 to 1.0, or from 0.9 to 1.0. BCI is herein defined to equal the weight percentage of diblock copolymer divided by 100% (i.e., weight fraction). The value of the block composite index can range from 0 to 1, wherein 1 would be equal to 100% diblock and zero would be for a material such as a traditional blend or random copolymer. Methods for determining BCI can be found, for example, in U.S. Published Patent Application No. 2011/0082258 from paragraph [0170] to [0189].

The olefin block composites can have a crystalline melting point (Tm) greater than 100° C., preferably greater than 120° C., and more preferably greater than 125° C. The melt index ("$I_2$") of the block composite can range from 0.1 to 1000 g/10 min., from 0.1 to 50 g/10 min., from 0.1 to 30 g/10 min., or from 1 to 10 g/10 min. The block composites can have a weight average molecular weight ("Mw") from 10,000 to 2,500,000, from 35,000 to 1,000,000, from 50,000 to 300,000, or from 50,000 to 200,000 g/mol.

Processes useful in producing the olefin block composites suitable for use in the present invention may be found, for example, in U.S. Patent Application Publication No. 2008/0269412, published on Oct. 30, 2008. Suitable catalysts and catalyst precursors for use in the present invention include metal complexes such as disclosed in WO 2005/090426, in particular, those disclosed starting on page 20, line 30 through page 53, line 20. Suitable catalysts are also disclosed in U.S. 2006/0199930; U.S. 2007/0167578; U.S. 2008/0311812; U.S. 2011/0082258; U.S. Pat. No. 7,355,089; and WO 2009/012215. Suitable co-catalysts are those disclosed in WO 2005/090426, in particular, those disclosed on page 54, line 1 to page 60, line 12. Suitable chain shuttling agents are those disclosed in WO 2005/090426, in particular, those disclosed on page 19, line 21 through page 20 line 12. Particularly preferred chain shuttling agents are dialkyl zinc compounds. The olefin block composites themselves are more fully described in U.S. Pat. No. 8,476,366.

In an embodiment, the EP/iPP diblock polymer has a density from 0.89 to 0.93 g/cc, or from 0.90 to 0.93 g/cc and/or a melt flow rate (MFR) from 6.5 to 12 g/10 min, or from 7 to 10 g/10 min, measured at 230° C./2.16 kg.

MAH-g-HDPE

The HDPE resins that can be used as the HIVE component of the MAH-g-HDPE component of the compatilizer are well known, commercially available, and made by any one of a wide variety of processes including, but not limited to, solution, gas or slurry phase; Ziegler-Natta or metallocene catalyzed; etc. In one embodiment these resins have a density of 0.95 to 0.965 g/cm$^3$ and a melt index (I2) of 0.1 to 4.0 before grafting with MALI Commercially available HDPE resins include but are not limited to DOW High Density Polyethylene resins and CONTINUUM™ and UNIVAL™ high density polyethylene resins, all available from The Dow Chemical Company; BS2581 available from Borealis; HOSTALEN™ ACP 5831D available from Lyondell/Basell; HD5502S available from Ineos, B5823 and B5421 available from Sabic, and HDPE 5802 and BM593 available from Total. The HDPE can be monomodal or bimodal.

MAH-g-HDPE are known compounds and are commercially available, e.g., AMPLIFY™ 1053 available from The Dow Chemical Company. MAH-g-HDPE can be made by various processes one of which is described in U.S. Pat. No. 4,950,541. In one embodiment the MAH content of the MAH-g-HDPE is from 0.9 to 2 wt %, or from 1 to 1.7 wt %, or from 1.1 to 1.6 wt %, based on the weight of the MAH-g-HDPE.

Nucleating Agent

Any compound that will initiate and/or promote the crystallization of the polymer components of the composition of this invention can be used as the nucleating agent. Examples of suitable nucleating agents include, but are not limited to, ADK NA-11 (CAS/185209-91-2), available commercially from Asahi Denim Kokai; HYPERFORM™ HPN-20E, available from Milliken Chemical; talc and calcium carbonate. Persons of ordinary skill in the art can readily identify other useful nucleating agents. The nucleating agents can be included in the inventive composition in amounts ranging from 0.05 to 5.0 wt %, from 0.09 to 2.0 wt %, or from 0.1 to 1.0 wt % based on the weight of the composition. In the absence of a filler, typically the amount of nucleating agent present in the composition is less than 1.0 wt %.

Filler

In one embodiment the compositions of this invention optionally can comprise a filler. Any filler known to a person of ordinary skill in the art may be used in the compositions of this invention. Non-limiting examples of suitable fillers include sand, talc, dolomite, calcium carbonate, clay, silica, mica, wollastonite, feldspar, aluminum silicate, alumina, hydrated alumina, glass head, glass microsphere, ceramic microsphere, thermoplastic microsphere, barite, wood flour, and combinations of two or more of these materials. If used, the amount of the filler in the composition can be from greater than 0 to 60 wt %, or from 1 to 50 wt %, or from 5 to 40 wt % of the weight of the composition. In some embodiments, a nucleating agent, e.g., talc, calcium carbonate, etc., can also act as a filler, and vice versa.

Additives

In one embodiment the composition of this invention may optionally comprise one or more additives. Known additives may be incorporated into the resin composition so long as the objects of the disclosure are not compromised. Nonlimiting examples of such additives include antioxidants, acid scavengers, heat stabilizers, light stabilizers, ultraviolet light absorbers, lubricants, antistatic agents, pigments, dyes, dispersing agents, inhibitors, neutralizing agents, foaming agents, plasticizers, flowability improvers, anti-blocking agents, slip additives, and weld strength improvers. Examples of antioxidants are hindered phenols (such as, for example, IRGANOX™ 1010) and phosphites (for example, IRGAFOS™ 168) both commercially available from BASF.

The additives may be employed alone or in any combination, and they are used, if used at all, in known amounts and in known ways, i.e., in functionally equivalent amounts known to those skilled in the art. For example, the amount of antioxidant employed is that amount which prevents the polymer blend from undergoing oxidation at the temperatures and environment employed during storage and ultimate use of the polymers. Such amount of antioxidants is usually in the range of from 0.0001 to 10, preferably from 0.001 to 5, more preferably from 0.01 to 2, wt % based upon the weight of the composition. Similarly, the amounts of any of the other enumerated additives are the functionally equivalent amounts.

Composition

The relative amounts of each component of the composition of this invention are described in Table 1.

TABLE 1

Component Amounts (Wt %) in the Composition

| Component | Broad Range | Preferred Range | More Preferred Range |
|---|---|---|---|
| PP | 22-49 | 28-43 | 28-42 |
| HDPE | 50-65 | 50-62 | 52-61 |
| Compatibilizer | 7-12 | 7.5-12 | 8-11 |
| Nucleating Agent | 0.05-5.0 | 0.6-3.0 | 0.8-1.0 |
| Filler | 0-15 | 1.0-12 | 1.0-8.0 |
| Additives | 0-1.0 | 0.1-0.9 | 0.1-0.8 |

In one embodiment the weight ratio of bimodal HDPE to PP is greater than (>) 1, preferably >1.5 and more preferably >2. In one embodiment the weight ratio of HINT to PP is of 0.8:1 to 3:1, preferably 0.9:1 to 3:1 and more preferably 1:1 to 2:1.

Compounding

Compounding of the compositions of this invention can be performed by standard means known to those skilled in the art. Examples of compounding equipment are internal hatch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

The compounding temperature of the polypropylene, HDPE, compatibilizer and nucleating agent and optional additive packages will vary with the composition, but it is typically in excess of 180° C. For a 3:1 weight ratio of polypropylene to HDPE, the compounding temperature is typically in excess of 245° C. The various components of the final composition can be added to and compounded with one another in any order, or simultaneously, but typically the polypropylene, HDPE and compatibilizer are first compounded with one another, and then with the nucleating agent, and then with the filler and/or additives. In some embodiments the additives are added as a pre-mixed masterbatch. Such masterbatches are commonly formed by dispersing the additives, either separately or together, in a small amount of one or more of the polypropylene and HDPE. Masterbatches are conveniently formed by melt compounding methods.

Buffer Tube

In one embodiment, the invention relates to improved retention of modulus after aging in buffer tube gels as compared to the typical PP copolymer-based material used for these applications. The improvement is achieved by blending an HDPE, preferably a bimodal HDPE, resin with a homopolymer PP having a 1% secant flexural modulus of >1,500 MPa measured according to ASTM D-790A along with two compatibilizers, e.g., INTUNE™ D5545.00 (EP-iPP diblock copolymer) and AMPLIFY™ 1053 (MAH-g-

HDPE). In one embodiment, the HDPE resin is a bimodal resin with 1.5 g/10 min MI (190C/2.16 kg) and density of 0.95 g/cc, and the PP is a homopolymer, or high crystallinity PP or heterophasic copolymer PP, with a melt flow rate (MFR) of 3.6 g/10 min (230° C./2.16 kg) such as BRASKEM™ H521. The PP may be a blend of two or more PP with at least one PP of high melt strength homopolymer PP or heterophasic impact copolymer PP with a 1% secant flexural modulus>1,400 MPa measured according to ASTM D-790A and an MFR of 0.4 to 4.0 (230° C./2.16 kg PP for improved melt strength which is an important property of a composition intended for use in the manufacture of a buffer tube. Important The buffer tubes of this invention exhibit one or more of the following properties: (1) lower grease absorption, (2) higher retention of secant modulus after aging, and (3) better impact strength as measured by low temperature brittleness, all as compared to a conventional buffer tube made from a PP copolymer. In the context of process, the crystallization half time of the composition is also improved (faster) as compared to similar blends with only an EP-iPP diblock copolymer as compatibilizer, i.e., a compatibilizer composition without a MAH-g-HDPE component.

Examples

Test Methods

Brittleness Temperature

Measured according to ASTM D746.

Melt Index

Measured in accordance with ASTM D1238 at 230° C. and 2.16 kg, and is reported in grams eluted per 10 minutes.

Tensile Modulus (Secant 2%)

Measured according to ASTM D638. Modulus is measured for fresh samples as well as samples exposed to LT410 gel at 85° C. for 14 days in the manner described below for determining grease resistance.

Tensile Strength (Stress at Break)

Measured according to ASTM D638.

Tensile Elongation (Strain at Break)

Measured according to ASTM D638.

Weight Gain (Grease Resistance)

The hydrocarbon gel used for these studies is LT 410 manufactured by Honghui in the Peoples Republic of China (PRC). Gel absorption is determined by measuring the weight gain of each sample with time. Samples are immersed in the LT 410 hydrocarbon gel and then placed in an 85° C. convection oven. Each sample is initially weighed and then re-weighed after 14 days in the gel after removing all the gel from the sample surfaces.

Gel Absorption

The hydrocarbon gel used for these studies is LA444 manufactured by the Stewart Group. The LA 444 is a low cost gel that is typically used for polybutylene terephthalate (PBT) based buffer tubes. The gel absorption is monitored by measuring the weight gain of each sample with time. Compression molded 1×1×0.075 in samples are immersed in the LA444 hydrocarbon gel and the samples are placed in an 85° C. convection oven. Each sample is initially weighed and then re-weighed after 14 days in the gel after removing all the gel from the sample surfaces. A weight percent increase for the samples is shown in the Tables 2 and 3. The inventive and the comparative samples roughly maintain a lower gel absorption as compared to the ESCORENE™ copolymer PP and the inventive samples show similar results to the BRASKEM™ PP.

Gel Aged 1% and 2% Secant Modulus

Type IV dog-bone samples for unaged and gel aged modulus testing are die cut from compression molded 75 mil thick plaques. The secant modulus of the buffer tube materials is measured by an INSTRON™ 4201 using a 100 lb load cell without an extensometer. The clamp jaw separation is 1 in and the jaws are serrated in order to achieve a tighter grip on the sample ends. The crosshead is set to stop its travel at the 0.10" (10%) strain point. The test is conducted at a 0.2 in/min crosshead speed till 0.6% strain and then switched to 2 in/min for the remainder of the test. The modulus is measured for fresh samples as well as samples that are exposed to LT410 gel at 85° C. for 14 days.

Melting Point

The melting point is measured by DSC by first heating to 180° C. at 10° C./min and then holding for 1 min. The samples are cooled at 10° C./min to −25° C. and then on second heating at 10° C./min to 200° C. the melting point is determined.

Crystallization Half-Time

Non-isothermal crystallization half-time is determined by heating samples to 180° C. and holding at that temperature for 1 minute. The samples are then cooled at 10° C./min and the time to complete half the maximum crystallization endotherm was read from the graph of time versus heat flow curve.
Tc method Log:
  1: Equilibrate at 30.00° C.
  2: Ramp 10.00° C./min to 180.00° C.
  3: Isothermal for 1.00 min
  4: Ramp 10.00° C./min to −25.00° C.
  5: Isothermal for 5.00 min
  6: Ramp 10.00° C./min to 200.00° C.
  7: End of method Melt Strength Oscillatory shear measurements are conducted with an ARES™ 1000 rheometer manufactured by TA Instruments. Samples are measured at 0.25% strain from 0.1-100 rad/s at 210° C. with 25 mm plates. The zero shear viscosity is estimated at the 0.1 rad/s frequency point.

Materials

Table 2 reports the materials used in the following examples, and certain of their properties.

TABLE 2

Base Resins and Certain of Their Properties

| Resin | Description | Source | Density (g/cc) | MFR 230° C./ 2.16 kg | MI 190° C./ 2.16 kg |
|---|---|---|---|---|---|
| DMDA-1250NT | Bimodal HDPE | Dow | 0.955 | 2.6 | 1.5 |
| DGDA-6944NT | Unimodal HDPE | Dow | 0.965 | | 8 |
| H521 PP | Homopolymer PP | Braskem | 0.9 | 3.6 | |
| INSPIRE™ 114 | Copolymer PP | Braskem | 0.9 | 0.5 | |
| INSPIRE™ 6025N | Homopolymer PP | Braskem | 0.9 | 2.5 | |
| ESCORENE™ 7032 | Copolymer PP | Exxon | 0.9 | 4 | |
| INTUNE™ D5545.00 | Diblock EP-iPP | Dow | 0.905 | 9.5 | |
| AMPLIFY™ Ty 1053 | MAH g-HDPE | Dow | 0.958 | | 2 |
| AMPLIFY™ Ty 1351 | MAH g-PE | Dow | 0.923 | | 2.1 |

Procedures

Preparation of Samples

All Comparative and Inventive Samples having two or more components are prepared by blending in a BRABENDER™ mixing bowl with 250 gram capacity and rotor type mixing blades. BRABENDER™ mixing bowl conditions are shown below:

| | |
|---|---|
| Zone 1 (° C.): | 185 |
| Zone 2 (° C.): | 180 |
| Melt (° C.): | 185-200 |
| RPM: | 30 |
| Flux (min) | 4.0 |
| RPM | 50 |
| Flux (min.) | 6.0 |

Tables 3, 4, 5A-1, 5A2, 5B-1 and 5B-2 report the compositions of the comparative and inventive examples, and various of their properties.

TABLE 3

Comparative Examples CE1-CE 7

| Components | CE1 | CE2 | CE3 | CE4 | CE5 | CE6 | CE7 |
|---|---|---|---|---|---|---|---|
| DMDA-1250NT | | 100 | | | | 67.84 | 54.84 |
| PP Braskem H521 | 100 | | | | | 31.5 | 44.5 |
| Inspire 114 | | | | 100 | | | |
| Inspire 6025N | | | | | 100 | | |
| Escorene 7032 (benchmark) | | | 100 | | | | |
| HPN20E | | | | | | 0.2 | 0.2 |
| Irganox 1010 to equal level of 3364 | | | | | | 0.18 | 0.18 |
| Irganox 1024 | | | | | | 0.28 | 0.28 |
| Total | 100.00 | 100.00 | 100.00 | 100.00 | 100.00 | 100.00 | 100.00 |
| T&E Unaged, 1% sec modulus, PSI | 242805 | 156094 | 230336 | | | 254756 | 217120 |
| T&E Aged, 1% sec modulus, PSI | 165727 | 118163 | 72166 | | | 151411 | 164271 |
| T&E unaged, 2% sec modulus, PSI | 173314 | 117659 | 142059 | | | 163100 | 155611 |
| T&E aged, 2% sec modulus, PSI | 114783 | 83691 | 46277 | | | 102442 | 108399 |
| Unaged peak tensile Stress, PSI | 5403 | 3955 | 3180 | | | 3799 | 3985 |
| Aged peak tensile Stress, PSI | 4715 | 3324 | 2308 | | | 3475 | 3469 |
| Strain break, unaged, % | 8 | 322 | 151 | | | 6 | 5 |
| T&E unaged, 2% sec modulus, MPa | 1195.0 | 811.2 | 979.5 | | | 1124.5 | 1072.9 |

TABLE 3-continued

Comparative Examples CE1-CE 7

| Components | CE1 | CE2 | CE3 | CE4 | CE5 | CE6 | CE7 |
|---|---|---|---|---|---|---|---|
| Act. Zero shear visc, 170 C., PaS | 10580.0 | 10570.0 | 10800.0 | | | 17060 | 11360 |
| Crystallization ½ time (min) | 2.05 | 0.43 | | | | | |
| Tm, C | 163.8 | 129.5 | 165.3 | | | | |
| LTB [approx F50], ° C. | >−10 | <−65* | −20 | | | >0 | >0 |
| Gel absorption**, wt %, 14D, 85C[L444] | 6.46 | 5.19 | 19.9 | 12.28 | 6.17 | 5.76 | 6.43 |

TABLE 4

Inventive Examples IE1-IE-5

| | IE1 | IE2 | IE3 | IE4 | IE5 |
|---|---|---|---|---|---|
| Components | | | | | |
| DMDA-1250NT 6944 | 59.84 | 59.84 | 54.84 | 54.84 | 54.84 |
| PP Braskem H521 PP TI4040 | 29.5 | 29.5 | 34.5 | 24.5 | 24.5 |
| Inspire 114 | | | | 10 | |
| Inspire 6025N | | | | | 10 |
| Perkadox BC FF | | | | | |
| Intune deblock EP-iPP [D5545.00] | 7.5 | 5 | 5 | 5 | 5 |
| Amplify 1053 Amplify 1351 | 2.5 | 5 | 5 | 5 | 5 |
| HPN20E Optifil JS | 0.2 | 0.2 | 0.2 | 0.2 | 0.2 |
| Irganox 1010 to equal level of 3364 | 0.18 | 0.18 | 0.18 | 0.18 | 0.18 |
| Irganox 1024 | 0.28 | 0.28 | 0.28 | 0.28 | 0.28 |
| Total | 100.00 | 100.00 | 100.00 | 100.00 | 100.00 |
| T&E Unaged, 1% sec modulus, PSI | 174870 | 219863 | 185044 | 179733 | 199073 |
| T&E Aged, 1% sec modulus, PSI | 128519 | 135052 | 184901 | 173006 | 194479 |
| T&E unaged, 2% sec modulus, PSI | 127571 | 157349 | 134933 | 131161 | 142459 |
| T&E aged, 2% sec modulus, PSI | 92703 | 96476 | 125164 | 112307 | 127330 |
| Unaged peak tensile Stress, PSI | 3979 | 4328 | 4024 | 4061 | 4124 |
| Aged peak tensile Stress, PSI | 3372 | 3563 | 3918 | 3517 | 3785 |
| Strain break, unaged, % | 33 | 37 | 60 | 164 | 49 |
| T&E unaged, 2% sec modulus, MPa | 879.6 | 1084.9 | | | |
| Act. Zero shear visc, 170 C., PaS | 19500.0 | 22560.0 | | 21730 | 23810 |
| Crystallization ½ time (min) | | 0.92 | 0.75 | | 1.11 |
| Tm, C | | 129.6, 161.9 | | | |
| LTB [approx F50], ° C. | <−30 | <−35 | −31.5 | −43 | −33 |
| Gel absorption**, wt %, 14D, 85C[L444] | 6.53 | 5.8 | 6.38 | 6.89 | 6.21 |

TABLE 5A-1

Comparative Examples CE8-16

| Components | CE8 | CE9 | CE10 | CE11 | CE12 | CE13 | CE14 | CE15 | CE16 |
|---|---|---|---|---|---|---|---|---|---|
| DMDA-1250NT | 59.84 | 59.84 | 64.84 | 64.84 | 68.34 | 49.84 | 49.84 | 59.84 | 59.74 |
| 6944 | | | | | | | | | |
| PP Braskem H521 | 29.5 | 29.5 | 29.5 | 29.5 | 29.5 | 39.5 | | 29.5 | 29.5 |
| PP TI4040 | | | | | | | 39.5 | | |
| Inspire 114 | | | | | | | | | |
| Inspire 6025N | | | | | | | | | |
| Perkadox BC FF | | | | | | | | | 0.1 |
| Intune diblock EP-iPP [D5545.00] | 2.5 | 10 | 5 | | | 10 | 10 | 5 | 5 |
| Amplify 1053 | 7.5 | | | 5 | 1.5 | | | | 5 |
| Amplify 1351 | | | | | | | | 5 | |
| HPN20E | 0.2 | 0.2 | 0.2 | 0.2 | 0.2 | 0.2 | 0.2 | 0.2 | 0.2 |
| Optifil JS | | | | | | | | | |
| Irganox 1010 to equal level of 3364 | 0.18 | 0.18 | 0.18 | 0.18 | 0.18 | 0.18 | 0.18 | 0.18 | 0.18 |
| Irganox 1024 | 0.28 | 0.28 | 0.28 | 0.28 | 0.28 | 0.28 | 0.28 | 0.28 | 0.28 |
| Total | 100.00 | 100.00 | 100.00 | 100.00 | 100.00 | 100.00 | 100.00 | 100.00 | 100.00 |

TABLE 5A-2

Comparative Examples CE8-16

| Components | CE8 | CE9 | CE10 | CE11 | CE12 | CE13 | CE14 | CE15 | CE16 |
|---|---|---|---|---|---|---|---|---|---|
| T&E Unaged, 1% sec modulus, PSI | 196680 | 160878 | 173575 | 180380 | 220605 | 210662 | 160140 | 175498 | 190792 |
| T&E Aged, 1% sec modulus, PSI | 139449 | 71409 | 110686 | 137189 | 124477 | 136484 | 106426 | 145462 | 132005 |
| T&E unaged, 2% sec modulus, PSI | 139732 | 122599 | 125535 | 132456 | 149375 | 143350 | 118894 | 125743 | 136615 |
| T&E aged, 2% sec modulus, PSI | 97965 | 58649 | 81382 | 96426 | 89424 | 93274 | 69950 | 93982 | 93050 |
| Unaged peak tensile Stress, PSI | 4146 | 4096 | 4200 | 4407 | 4250 | 4483 | 3700 | 3739 | 4092 |
| Aged peak tensile Stress, PSI | 3558 | 3266 | 3472 | 3499 | 3172 | 3652 | 2699 | 3103 | 3500 |
| Strain break, unaged, % | 9 | 93 | 67 | 6 | 5 | 194 | 356 | 8 | 44 |
| T&E unaged, 2% sec modulus, MPa | 963.4 | 845.3 | 865.5 | 913.3 | 1029.9 | 988.4 | 819.7 | | |
| Act. Zero shear visc, 170 C., PaS | 17200.0 | tbd | 22050.0 | | | 10970.0 | | | 48400 |
| Crystallization ½ time (min) | | 1.56 | 1.56 | 0.85 | 1.18 | 1.78 | 1.19 | | |
| Tm, C | | 129.2, 162.6 | 129.5, 162.8 | 129.4, 161.3 | 129.6, 161.6 | 129.2, 163.5 | 128.8, 163.9 | | |
| LTB [approx F50], ° C. | >−20 | −47 | −55 | >−20 | | −36 | | >−30 | >−10 |
| Gel absorption**, wt %, 14D, 85C[L444] | 6.00 | 6.31 | 5.89 | 5.45 | 5.48 | 6.65 | | 6.84 | 5.95 |

TABLE 5B-1

Comparative Examples CE17-25

| Components | CE17 | CE18 | CE19 | CE20 | CE21 | CE22 | CE23 | CE24 | CE25 |
|---|---|---|---|---|---|---|---|---|---|
| DMDA-1250NT | 54.84 | 49.84 | | | | | 66.84 | 64.84 | 59.84 |
| 6944 | | | 59.74 | 59.84 | 59.84 | 59.84 | | | |
| PP Braskem H521 | 29.5 | 39.5 | 29.5 | 29.5 | 29.5 | 29.5 | 29.5 | 29.5 | 29.5 |
| PP TI4040 | | | | | | | | | |
| Inspire 114 | | | | | | | | | |
| Inspire 6025N | | | | | | | | | |

TABLE 5B-1-continued

Comparative Examples CE17-25

| Components | CE17 | CE18 | CE19 | CE20 | CE21 | CE22 | CE23 | CE24 | CE25 |
|---|---|---|---|---|---|---|---|---|---|
| Perkadox BC FF | | | 0.1 | | | | | | |
| Intune diblock EP-iPP [D5545.00] | 5 | 5 | 5 | 5 | 2.5 | 7.5 | 1.5 | 2.5 | |
| Amplify 1053 | 5 | 5 | 5 | 5 | 7.5 | 2.5 | 1.5 | 2.5 | 10.0 |
| Amplify 1351 | | | | | | | | | |
| HPN20E | 0.2 | 0.2 | 0.2 | 0.2 | 0.2 | 0.2 | 0.20 | 0.20 | 0.20 |
| Optifil JS | 5 | | | | | | | | |
| Irganox 1010 to equal level of 3364 | 0.18 | 0.18 | 0.18 | 0.18 | 0.18 | 0.18 | 0.18 | 0.18 | 0.18 |
| Irganox 1024 | 0.28 | 0.28 | 0.28 | 0.28 | 0.28 | 0.28 | 0.28 | 0.28 | 0.28 |
| Total | 100.00 | 100.00 | 100.00 | 100.00 | 100.00 | 100.00 | 100.00 | 100.00 | 100.00 |

TABLE 5B-2

Comparative Examples CE17-25

| Components | CE17 | CE18 | CE19 | CE20 | CE21 | CE22 | CE23 | CE24 | CE25 |
|---|---|---|---|---|---|---|---|---|---|
| T&E Unaged, 1% sec modulus, PSI | 181745 | 226955 | 219893 | 211340 | 221278 | 196668 | 213253 | 200521 | 238532 |
| T&E Aged, 1% sec modulus, PSI | 118358 | 151652 | 130433 | 114270 | 146466 | 155526 | 83611 | 89386 | 109564 |
| T&E unaged, 2% sec modulus, PSI | 134631 | 155519 | 153911 | 150081 | 160965 | 139401 | 149989 | 149981 | 168758 |
| T&E aged, 2% sec modulus, PSI | 86142 | 105002 | 93431 | 85623 | 106016 | 105943 | 63040 | 65714 | 75182 |
| Unaged peak tensile Stress, PSI | 4155 | 4259 | 4374 | 4349 | 4299 | 4144 | 3980 | 3978 | 4177 |
| Aged peak tensile Stress, PSI | 3753 | 3792 | 4085 | 3951 | 3987 | 3943 | 3292 | 3378 | 3415 |
| Strain break, unaged, % | 15 | 68 | 6 | 7 | 7 | 8 | 7 | 52 | 6 |
| T&E unaged, 2% sec modulus, MPa | | | 7028 | 3927 | | | | | |
| Act. Zero shear visc, 170 C., PaS | 24070 | 16510 | | | | | 13300 | 20400 | 18000 |
| Crystallization ½ time (min) | 0.55 | | 0.35 | 0.46 | 0.4 | | | | |
| Tm, C | | | | | | | | | |
| LTB [approx F50], ° C. | −23 | −10 | >−20 | | | | >0 | −12.5 | >0 |
| Gel absorption**, wt %, 14D, 85C[L444] | 5.59 | 6.12 | 5.4 | 5.6 | 5.5 | 5.75 | 5.8 | 5.8 | 5.7 |

Table 6 shows the minimum property requirements for the inventive examples. The inventive examples meet all of the requirements listed in the table.

TABLE 6

Minimum Property Requirements for the Inventive Examples

| Property Ranges: | Unit | Value |
|---|---|---|
| T&E, 1% Sec. Modulus initial, minimum | PSI | 162,000 |
| T&E, 1% Sec. Modulus gel aged, minimum | PSI | 125,000 |
| T&E, unaged strain at break, minimum | % | 25 |
| LTB, F50 | ° C. | ≤−20 |
| Zero shear visc., at 170° C., minimum | PaS | 11,500 |

Results and Discussion

Samples CE 6 and 7 are samples without EP-iPP and MAH-G-HDPE compatibilizers and are very brittle as indicated by the poor strain at break and high low temperature brittleness (LTB) values.

Samples CE9 and CE10 are comparative samples with EP-iPP at different levels resulting in lower aged and unaged modulus values as compared to IE2. The samples with MAH-g-HDPE (CE11 and CE12) result in higher aged modulus values versus CE9 and CE10 containing EP-iPP only but are more brittle. The CE9,10,11,12 can be compared against one another because they all contain the same amount of PP (29.5 wt %).

CE13 does achieve similar aged 1% secant modulus as Inventive sample IE2 but an increased level of the high modulus PP is needed. However the 2% aged secant modulus for sample IE2 is still slightly higher. IE2 also shows lower gel absorption versus sample CE13. Gel absorption is only slightly higher in IE2 as compared to CE11 and CE12. However CE11 and CE12 have poor strain at break values indicating high brittleness.

IE2 has overall much lower gel absorption versus the comparative commercial grade PP (ESCORENE™) used for buffer tubes and maintains much higher modulus after gel aging while achieving improved low temperature brittleness values and melt strength. IE2 shows that combining both EP-iPP and MAH-g-HDPE produces overall the best balance of properties as compared to all the samples with the same concentration of PP. Improvements in properties such as retention of modulus after aging, low gel absorption, lower LTB values and improved melt strength are achieved as compared to samples with EP-iPP or MAH-g-HDPE alone as compatibilizer.

CE14 uses a heterophasic copolymer PP of similar MFR to the H521 and shows lower aged modulus versus CE13 and IE2.

IE2 shows faster crystallization half times as compared to the samples with only EP-iPP as compatibilizer.

The FIGURE shows that the melt strength of the IE2 sample is higher than that of the samples with just EP-iPP as the compatibilizer. The IE2 melt strength is also higher than that of CE3 (the sample containing ESCORENE™ copolymer PP.

DSC graphs (not shown) of the samples with both EP-IPP and MAH-g-HDPE (CE18, CE17, CE20) show one singular peak as compared to the samples with just EP-iPP (CE10, CE9), which consistently show two separate crystallization peaks in the cooling curves. This result provides evidence of co-crystallization in the EP-IPP and MAH-g-HDPE blends and effects the mechanical properties of the blends.

What is claimed is:

1. A composition comprising in weight percent (wt %) based on the weight of the composition:
   (A) 22-49% polypropylene (PP),
   (B) 50-65% high density polyethylene (HDPE),
   (C) 7-12% compatibilizer comprising in wt % based on the weight of the compatibilizer:
      (1) 30-90% olefin block composite comprising ethylene-propylene (EP) copolymer, isotactic polypropylene (iPP), and an EP-iPP diblock polymer, and
      (2) 10-70% maleic anhydride grafted HDPE (MAH-g-HDPE); and
   (D) 0.05-5.0% nucleating agent.

2. The composition of claim 1 in which the HDPE is a bimodal HDPE (b-HDPE).

3. The composition of claim 1 in which the PP is a high crystallinity polypropylene, a melt flow rate (MFR) of less than or equal to (≤) 12 g/10 min (230° C./2.16 kg).

4. The composition of claim 1 further comprising a filler.

5. The composition of claim 4 in which the filler is present in an amount of greater than 0 to 60 wt % based on the total weight of the composition.

6. The composition of claim 5 in which the filler is at least one of sand, talc, dolomite, calcium carbonate, clay, silica, mica, wollastonite, feldspar, aluminum silicate, alumina, hydrated alumina, glass bead, glass microsphere, ceramic microsphere, thermoplastic microsphere, barite, wood flour, and combinations of two or more of these materials.

7. The composition of claim 1 without a filler and in which the nucleating agent is present in an amount of less than 1 wt % based on the total weight of the composition.

8. A process of making a tube, the process comprising the steps of:
   (I) Compounding:
      (A) 22-49% polypropylene (PP),
      (B) 50-65% high density polyethylene (HDPE),
      (C) 7-12% compatibilizer comprising in wt % based on the weight of the compatibilizer:
         (1) 30-90% olefin block composite comprising ethylene-propylene (EP) copolymer, isotactic polypropylene (iPP), and an EP-iPP diblock polymer, and
         (2) 10-70% maleic anhydride grafted HDPE (MAH-g-HDPE); and
      (D) 0.05-5.0% nucleating agent; and
   (II) extruding the mixture of (a) into the shape of a tube.

9. The process of claim 8 in which the compounding is melt compounding.

10. A tube made by the process of claim 8.

11. A cable comprising the tube of claim 10.

12. The process of claim 8 in which the HDPE is bimodal.

13. The process of claim 8 in which the PP is a high crystallinity PP with an MFR of (≤) 12 g/10 min (230° C./2.16 kg).

* * * * *